United States Patent
Karame et al.

(10) Patent No.: US 11,362,841 B2
(45) Date of Patent: Jun. 14, 2022

(54) METHOD AND SYSTEM FOR PROVIDING SECURITY IN TRUSTED EXECUTION ENVIRONMENTS

(71) Applicant: NEC Laboratories Europe GmbH, Heidelberg (DE)

(72) Inventors: Ghassan Karame, Heidelberg (DE); Claudio Soriente, Madrid (ES)

(73) Assignee: NEC CORPORATION, Tokyo (JP)

(*) Notice: Subject to any disclaimer, the term of this patent is extended or adjusted under 35 U.S.C. 154(b) by 427 days.

(21) Appl. No.: 16/454,136

(22) Filed: Jun. 27, 2019

(65) Prior Publication Data

US 2020/0014546 A1   Jan. 9, 2020

Related U.S. Application Data

(60) Provisional application No. 62/694,477, filed on Jul. 6, 2018.

(51) Int. Cl.
*H04L 9/32* (2006.01)
*G06F 21/12* (2013.01)
*H04L 9/40* (2022.01)

(52) U.S. Cl.
CPC .......... *H04L 9/3255* (2013.01); *G06F 21/123* (2013.01); *H04L 63/1441* (2013.01)

(58) Field of Classification Search
CPC .................................................... H04L 9/3255
See application file for complete search history.

(56) References Cited

U.S. PATENT DOCUMENTS

| 5,825,880 A | * | 10/1998 | Sudia | H04L 9/3255 |
| | | | | 713/180 |
| 2013/0326602 A1 | * | 12/2013 | Chen | G06F 21/64 |
| | | | | 726/6 |

(Continued)

FOREIGN PATENT DOCUMENTS

WO   WO 2017179059 A1   10/2017

OTHER PUBLICATIONS

J-M Bohli et al.: "Security and Privacy-Enhancing Multicloud Architectures", IEEE Transactions on Dependable and Secure Computing, vol. 10, No. 4, Jul. 1, 2013 (Jul. 1, 2013), pp. 212-224, XP055621361.

(Continued)

*Primary Examiner* — Ponnoreay Pich
(74) *Attorney, Agent, or Firm* — Leydig, Voit & Mayer, Ltd.

(57) ABSTRACT

A method secures a system that includes an application owner, a master application, and a plurality secure platforms. The master application receives from the application owner an application and an input. The application computes a function to calculate an output from the input. The master application deploys replicas of the application on a number of the secure platforms. The master application establishes a secure channel with each of the replicas, and sends at least a portion of the input to the replicas. The master application receives a result calculated by each of the replicas. The result is determined according to the function and the at least the portion of input. The master application determines the output based on the result received from each of the replicas; and sends to the application owner, the output.

14 Claims, 5 Drawing Sheets

(56) References Cited

U.S. PATENT DOCUMENTS

| | | | |
|---|---|---|---|
| 2015/0229480 A1* | 8/2015 | Joye | H04L 9/3255 713/176 |
| 2018/0316499 A1* | 11/2018 | Choi | G06F 21/755 |
| 2020/0014546 A1* | 1/2020 | Karame | H04L 9/3234 |

OTHER PUBLICATIONS

Jian Liu et al.: "Scalable Byzantine Consensus via Hardware-assisted Secret Sharing", arxiv.org, Cornell University Library, Dec. 15, 2016 (Dec. 15, 2016), XP080744551.
Ahmad Moghimi, et al., "CacheZoom: How SGX Amplifies The Power of Cache Attacks", arXiv:1703.06986v2 [cs.CR], Aug. 20, 2017, pp. 1-14.
Marcus Hahnel, et al., "High-Resolution Side Channels for Untrusted Operating Systems", USENIX Annual Technical Conference (USENIX ATC '17), Jul. 12-14, 2017, pp. 299-312.
Paul Kocher, et al., "Spectre Attacks: Exploiting Speculative Execution", arXiv:1801.01203v1 [cs.CR], Jan. 3, 2018, pp. 1-16.
Guoxing Chen, et al., "SGXPECTRE Attacks: Stealing Intel Secrets from SGX Enclaves via Speculative Execution", arXiv:1802.09085v3 [cs.CR], Jun. 3, 2018, pp. 1-16.
Dan Boneh, et al., "Short signatures from the Weil pairing", International Conference on the Theory and Application of Cryptology and Information Security, Dec. 2001, pp. 514-532.
Alexandra Boldyreva, "Threshold Signatures, Multisignatures and Blind Signatures Based on the Gap-Diffie-Hellman-Group Signature Scheme", PKC 2003, LNCS 2567, Dec. 2003, pp. 31-46.
Ivan Damgard, et al., "Multiparty Computation from Somewhat Homomorphic Encryption", Advances in Cryptology—CRYPTO 2012, Dec. 2012, pp. 643-662.

* cited by examiner

METHOD AND SYSTEM FOR PROVIDING SECURITY IN TRUSTED EXECUTION ENVIRONMENTS

CROSS REFERENCE TO PRIOR APPLICATION

Priority is claimed to U.S. Provisional Patent Application No. 62/694,477 filed on Jul. 6, 2018, the entire disclosure of which is hereby incorporated by reference herein.

FIELD

The present invention relates to a method and system for providing security in trusted execution environments.

BACKGROUND

Trusted Execution Environments (TEEs), e.g., Intel SGX, allow for running applications in isolation from other software on the same host. Secret material, e.g., cryptographic keys for a given piece of code, are protected by the platform hardware and managed by secure mechanisms, e.g., sealing and encrypted memory. For example, application secret keys can be sealed (i.e., encrypted) at rest with keys only available to the platform hardware. At runtime, the application secret keys are unsealed and made available to the application. Encrypted memory ensures that such keys are only available in clear text within the processor and that they are encrypted when written to memory.

Keys in TEE applications may be used to for different security provisions. For example, a key may be used to sign the output of the application so that external entities can verify the authenticity of the output, i.e., that the output was produced by that specific TEE application. Alternatively, an encryption key may be used to encrypt the output so that it is only available to the intended recipient that holds the corresponding decryption key. Similarly, a key may be used by a TEE application either to decrypt incoming data or to verify its authenticity.

TEEs, including Intel SGX, are vulnerable to side-channel attacks. See, e.g., Ahmad Moghimi et al., "CacheZoom: How {SGX} Amplifies the Power of Cache Attacks," CHES 2017 (the entire contents of which are hereby incorporated by reference herein); Marcus Hähnel et al., "High-Resolution Side Channels for Untrusted Operating Systems," Usenix ATC 2017 ("Hähnel") (the entire contents of which are hereby incorporated by reference herein). Recently, an attack that leverages speculative execution of processors known as Spectre (see e.g., Paul Kocher et al., "Spectre Attacks: Exploiting Speculative Execution," CoRR abs/1801.01203 2018 (the entire contents of which are hereby incorporated by reference herein)) was successfully adapted to Intel SGX to leak secrets of a victim TEE application (Guoxing Chen et al., "SgxPectre Attacks: Stealing Intel Secrets from SGX Enclaves via Speculative Execution," CoRR/abs/1802.09085, 2018 (the entire contents of which are hereby incorporated by reference herein)). Once the key has been leaked, any security provisions that relies on the secrecy of that key is invalidated. For example, if the key is used to sign the application output, the adversary may use the leaked key to sign arbitrary data on behalf of the application.

Patches and architectural changes are periodically issued to mitigate side-channels attacks. However, side-channels are an inherent aspect of platforms where multiple distrusting applications run, and a TEE architecture immune to side-channels is unlikely to appear on the market.

SUMMARY

In an embodiment, a method secures a system that includes an application owner, a master application, and a plurality secure platforms. The master application receives from the application owner an application and an input. The application is configured to compute a function to calculate an output from the input. The master application deploys replicas of the application on a number of the secure platforms. The master application establishes a secure channel with each of the replicas, and sends at least a portion of the input to the replicas. The master application receives a result calculated by each of the replicas. The result is determined according to the function and the at least the portion of input. The master application determines the output based on the result received from each of the replicas; and sends the output to the application owner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
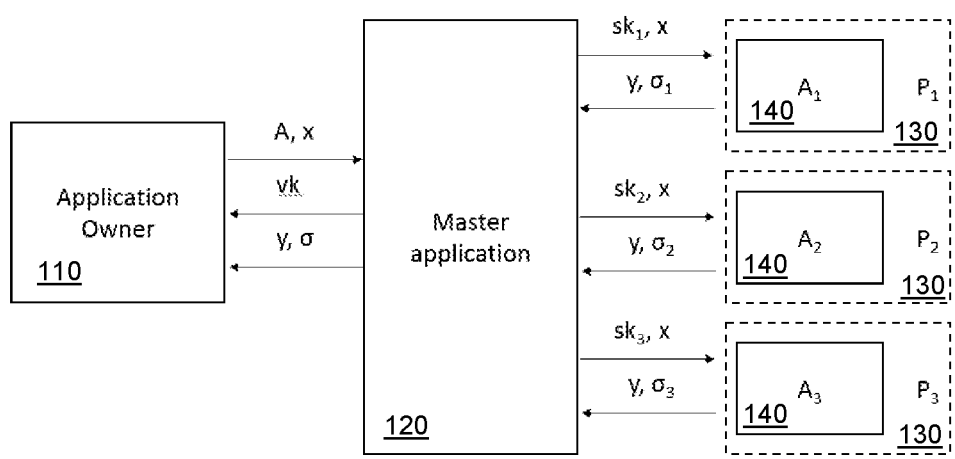
FIG. 1 illustrates a system implementing an embodiment of the present invention.

The present invention provides systems and methods that mitigate consequences of side-channel attacks in trusted execution environments (TEEs). Embodiments of the present invention solve, for example, the problem of leakage of secret material from TEEs, such as Intel SGX, via side-channels.

TEEs are susceptible to side-channel attacks that may leak secret material, e.g., private keys of an application running in a TEE. Leakage of the private key invalidates any security provisions that relies on the secrecy of such key. Despite a number of patches and architectural improvements aimed at countering side-channel attacks thus far available, it is unlikely that a traditional TEE immune to side-channels will be feasible in the near future. Embodiments of the present invention, however, provide an improvement over the state of the art by introducing techniques to create side-channel tolerant TEEs. For example, embodiments of the present invention overcome weaknesses of TEE applications related to side-channels by implementing mechanisms that provide desirable security provisions while tolerating side-channels.

A fundamental precondition of a successful side-channel attack is that the attacker co-locates with the victim, i.e., the victim application and the attacker's code run on the same platform. Embodiments of the invention, however, leverage replication and distribution of TEE applications on different platforms to mitigate the effectiveness of side-channel attacks. An adversary may still co-locate with some of the platforms where replicas of the victim application are running. The adversary may, therefore, leak the secrets of those application replicas by means of side-channel attacks. Yet, the adversary will not be able to invalidate the security provisions guaranteed by the secret keys of the application replicas, unless the adversary co-locates with all of the application replicas.

Embodiments of the current invention are discussed below in connection with a scenario where an application owner deploys a TEE application to compute a function $f$ over owner-supplied inputs. That is, the TEE application computes and outputs $y=f(x)$ where x is the input supplied by the application owner.

Embodiment of the present invention leverage seamless application replication in conjunction with cryptographic mechanisms to make the TEE applications robust to side-channels attack. In example embodiments, the application owner provides the code of the TEE application to a master application. The master application is a specialized TEE application that takes care of replicating the TEE application over several platforms and of coordinating the cryptographic protocols required.

An aspect of embodiments of the present invention is that, by using replication and threshold signature schemes, the consequences of a side-channel attack to TEE applications that require authenticated output data are mitigated.

Another aspect of embodiments of the present invention is that, by using replication and multi-party computation, the consequence of a side-channel attack to TEE applications that require confidential input and output data are mitigated.

For the present discussion, consider the scenario where the application owner requires the TEE application output to be authenticated by means of a signature scheme. In an embodiment of the present invention, the master application creates n replicas of the TEE application and distributes each replica on a different platform (e.g., a TEE enclave of a different platform). Further, the master application instantiates a t-out-of-n threshold signature scheme and provides each application replica with a share of the signing key. The corresponding verification key is supplied to the application owner. Each application replica receives the owner supplied input x, computes $y=f(x)$, and uses its share of the signing key to compute a partial signature on y. Each application replica sends y and the partial signature to the master application. The master application checks that each application replica has returned the same value y. The master application then aggregates all partial signatures and forwards y and the aggregated signature to the application owner. The latter application owner may verify authenticity of y by verifying the aggregated signature using the verification key received by the master application.

As such, the adversary must launch a successful side-channel attack on at least t platforms to be able to sign arbitrary data on behalf of the application. In deployments, the threshold t of the signature scheme may be set to the number of platforms available (i.e., t=n), so that the adversary must launch a successful side-channel attack on all of the platforms in order to sign data on behalf of the TEE application.

In another embodiment, consider a scenario where the application owner requires input/output confidentiality by means of an encryption/decryption key. Here, a master application creates n replicas of the TEE application and distributes each replica on a different platform. The master application distributes encryption/decryption keys to the replicas in order to establish point-to-point confidential channels between any pair of replicas and between each replica and the master application. The master application may also create a confidential channel with the application owner by means of a shared key. Given the owner supplied input x, the master application computes random additive shares of x and distributes each share to each of the application replicas. The n replicas engage in a secure multi-party computation protocol so that each replica computes a random additive share of $y=f(x)$. See Ivan Damgård et al., Multiparty Computation from Somewhat Homomorphic Encryption, CRYPTO 2012 (discussing multi-party computation, the entire contents of which are hereby incorporated by reference herein). Each application replica sends the random additive share of y to the master application. The master application recovers y by summing the additive shares and forwards the result to the application owner.

Since each application instance receives a random share of the input x, an adversary that successfully compromises the secret keys of up to n−1 replicas, does not learn any information on x. Further, because of the security provisions of secure multi-party computation, an adversary that compromises the secret keys of up to n−1 replicas learns nothing about y.

An embodiment of the present invention provides a method that secures a system that includes an application owner, a master application, and a plurality secure platforms. The master application receives from the application owner an application and an input. The application computes a function to calculate an output from the input. The master application deploys replicas of the application on a number of the secure platforms. The master application establishes a secure channel with each of the replicas, and sends at least a portion of the input to the replicas. The master application receives a result calculated by each of the replicas. The result is determined according to the function and the at least the portion of input. The master application determines the output based on the result received from each of the replicas; and sends the output to the application owner.

The method may further include: instantiating, by the master application a threshold signature signing scheme. The instantiating may include: distributing, by the master application, a respective share of a signing key of the threshold signature signing scheme to each of the replicas; and sending, by the master application, a verification key of the threshold signature signing scheme to the application owner; and receiving, by the master application from each of the replicas, a respective partial signature of the result calculated by the respective one of the replicas, the respective partial signature being based on the respective share of the signing key.

The master application may send the entire input to each of the replicas. The respective result received by the master application for each of the replicas may correspond to the output of the function applied to the input, The method may further include: generating, by the master application, a reconstructed signature based on the respective partial signature received from each of the replicas; and outputting, by the master application, the reconstructed signature to the application owner. The reconstructed signature may be configured to be verified by the verification key. The respective result received by the master application for each of the replicas may be signed with the respective partial signature, and the output may be configured to be verified using the reconstructed signature and the verification key.

In an embodiment, the master application and the secure platforms are instantiated in trusted execution environment enclaves.

The method may further include receiving, by the master application, a replication parameter. The number of replicas and the number of security platforms may each correspond to the replication parameter.

In an embodiment, the number of secure platforms is at least two.

In an embodiment, the method further includes: respectively selecting, by the master application, a key for each pair of the replicas, and respectively sending, by the master application, the respective key to each pair of the replicas. The respective key may be configured to enable a secure channel between the respective pair of the replicas. In an embodiment, the key is a random key.

The method may further include: splitting, by the master application, the input into shares of the input. The at least a portion of the input respectively sent to each of the respective replicas may corresponds to one of the shares of the input. The respective result calculated by each of the replicas may be a partial result that is determined according to the function applied to the respective one of the shares of the input. The output may be determined by aggregating the partial result respectively received from each of the replicas.

According to an embodiment, the function is linear and the respective partial result received is calculated individually the respective one of the replicas.

In an embodiment, the function is non-linear and the respective partial result received is calculated based on a secure multi party protocol between the replicas.

Another embodiment of the present invention provides a secure platform having a processor coupled to a non-transitory storage memory containing instructions, which when executed by the processor, cause the secure platform to instantiate a master application in a secure enclave, the master application configured to perform the following operations: receive an application and an input, the application configured to compute a function to calculate an output from the input when executed; deploy a plurality of replicas of the application on a number of secure platforms; establish a secure channel with each of the replicas; send at least a portion of the input to the replicas; receive a result calculated by each of the replicas, the result being determined according to the function and the at least the portion of input; determine the output based on the result received from each of the replicas; and send to an application owner, the output.

The master application can be configured to utilize either a replication and threshold signature scheme or a replication and multi-party computation scheme to protect against side-channel attacks.

Another embodiment of the present invention provides a non-transitory computer-readable storage medium storing instructions that upon execution cause a master application, instantiated in a secure enclave, to perform the following operations: receive an application and an input, the application configured to compute a function to calculate an output from the input when executed; deploy a plurality of replicas of the application on a number of secure platforms; establish a secure channel with each of the replicas; send at least a portion of the input to the replicas; receive a result calculated by each of the replicas, the result being determined according to the function and the at least the portion of input; determine the output based on the result received from each of the replicas; and send to an application owner, the output.

An embodiment of the invention is based on the threshold version of the BLS signature scheme. More information on the BLS signature scheme can be found in: Dan Boneh et al., "Short Signatures from the Weil Pairing," ASIACRYPT 2001, the entirety of which is incorporated by reference herein.

For a BLS signature scheme, let G be a Gap-Diffie-Hellman group—i.e., a group of prime order p with generator g and pairing operation $e:G \times G \rightarrow G_T$. Further, let H be a hash function that maps strings of arbitrary length to elements of G. The BLS signature scheme is a triplet of algorithms KeyGen, Sign, Verify, defined as follows:

KeyGen picks a random x in $Z_p^*$, computes, and returns verification key $vk=g^x$ and signing key $sk=x$.

Sign takes as input a signing key sk and a message m, computes a $\sigma H(m)^{sk}$ and returns $\sigma$.

Verify takes as input a verification key vk, a message m and a signature $\sigma$, and it returns 1 if $e(\sigma,g)=e(H(m),vk)$ or 0 otherwise.

Threshold BLS signatures are described in Alexandra Boldyreva, "Threshold Signatures, Multisignatures and Blind Signatures Based on the Gap-Diffie-Hellman-Group Signature Scheme," Public Key Cryptography 2003 ("Boldyreva"), the entire contents of which are incorporated by reference herein.

For Threshold BLS signatures, given a BLS signature scheme (KeyGen, Sign, Verify) the threshold version has an additional triplet of algorithms: Share, Share-Sign, Reconstruct, defined as follows:

Share picks as an input a signing key sk and two values t, n where $t \leq n$. It outputs n random key-shares $sk_1, \ldots sk_n$ computed as follows. Pick at random t−1 coefficients $a_1, \ldots, a_{t-1}$ to define polynomial $p(x)=sk+a_1x+a_2x^2+ \ldots a_{t-1}x^{t-1}$. Set $sk_i=p(i)$ for ($\leq i \leq n$). If t=n, then $sk_1, \ldots sk_{n-1}$ are chosen at random and $sk_n$ is set to $sk_n=sk-(sk_1+ \ldots +sk_n)$ Share-Sign takes as an input a key-share $sk_i$ and a message m, computes $\sigma_i=H(m)sk_i$ and returns a signature-share $\sigma_i$.

Reconstruct takes as an input a set R of at least t signature-shares on a message m and outputs a signature $\sigma=\Pi_{i \in R}(\sigma_i^{L_i})$ where $L_i$ is the appropriate Lagrange coefficient. If t=n, then we require $|R|=n$ and the signature is computed as $\sigma=\Pi_{i \in R}(\sigma_i)$ Here, one designated party—known as the dealer—computes a key pair sk,vk by calling KeyGen. The dealer then computes n key-shares by calling Share on sk. Each key-share is given to a different signer. Each signer computes a signature-share on a message m by calling Share-Sign with input its key-share. Given at least t signature-shares on a message m, any party can reconstruct a valid signature $\sigma$ on message m by calling Reconstruct. The signature output by Reconstruct can be verified with vk by calling Verify.

The security provisions of the threshold signature scheme guarantee that no coalition of up to t−1 holders of key-shares can produce a valid signature on arbitrary message m.

FIG. 1 illustrates an embodiment of a system for providing security in a TEE according to the present invention. As shown in FIG. 1, a system 100 may include an application owner 110 in communication with a master application 120, which in turn is in communication with at least one compute device 130 hosting at least one platform P. The application owner 110 and master application 120 may also be hosted on compute devices (e.g., personal computers, servers, IoT devices, mobile phones, etc.).

In one embodiment of the invention, the application owner 110 provides the master application 120 with a TEE application code A, an input x, and a replication parameter n.

For $1 \leq i \leq n$, the master application 120 deploys the application A on the platform $P_i$. This is done by sending a replica of the application A to the platform $P_i$. The platform $P_i$, in turn, installs the application A in a local enclave 140 of the compute device 130 hosting the platform $P_i$. According to an embodiment, the local enclave 140 may be secure enclave such as provided by Intel SGX. $A_i$ denotes the replica of the application A that runs in an enclave 140 on the platform $P_i$. As shown in the embodiment of FIG. 1, n=3; thus the master application 120 deploys three replicas $A_1$-$A_3$ of the application A individually in the three platforms $P_1$-$P_3$.

According to an embodiment, n is at least two, such that at least two enclaves are used to ensure security against leakage.

The master application 120 also verifies that a replica $A_i$ of the application A is running in an enclave 140 on each platform $P_i$ by means of the remote attestation service. For example, an embodiment can use the remote attestation service of Intel SGX. Remote attestation also allows the master application 120 and the replica $A_i$ of the application A to establish a confidential channel by means of a shared key. Any further communication between the master application 120 and any replica $A_i$ of the application A happens over the corresponding confidential channel.

The master application 120 sets up a threshold signature scheme TS (see e.g., Boldyreva discussing threshold signature schemes) and runs TS.KeyGen to obtain a signing key sk and its corresponding verification key vk. The master application 120 calls TS.Share on the signing key sk to generate key-shares $sk_1, \ldots sk_n$, and provides each replica $A_i$ with a corresponding key-share $sk_i$ ($1 \leq i \leq n$). The verification key vk is provided to the application owner 100 by the master application 120.

The master application 120 forwards x to each application replica $A_i$. Each application replica $A_i$ computes y=$f$(x), and uses its key-share $sk_i$ to sign the outcome of its computation by calling TS.Share-Sign. That is, each application replica $A_i$ outputs (y, $\sigma_i$), where $\sigma_i$ is a partial signature over y computed by using $sk_i$.

The master application 120 collects (y, $\sigma_i$ . . . , $\sigma_n$), computes a reconstructed signature $\sigma$ by calling TS.Reconstruct on the partial signatures $\sigma_i, \ldots, \sigma_n$, and forwards (y, $\sigma$) to the application owner 110 who may verify authenticity of the reconstructed signature $\sigma$ by using the verification key vk.

Figure 2:
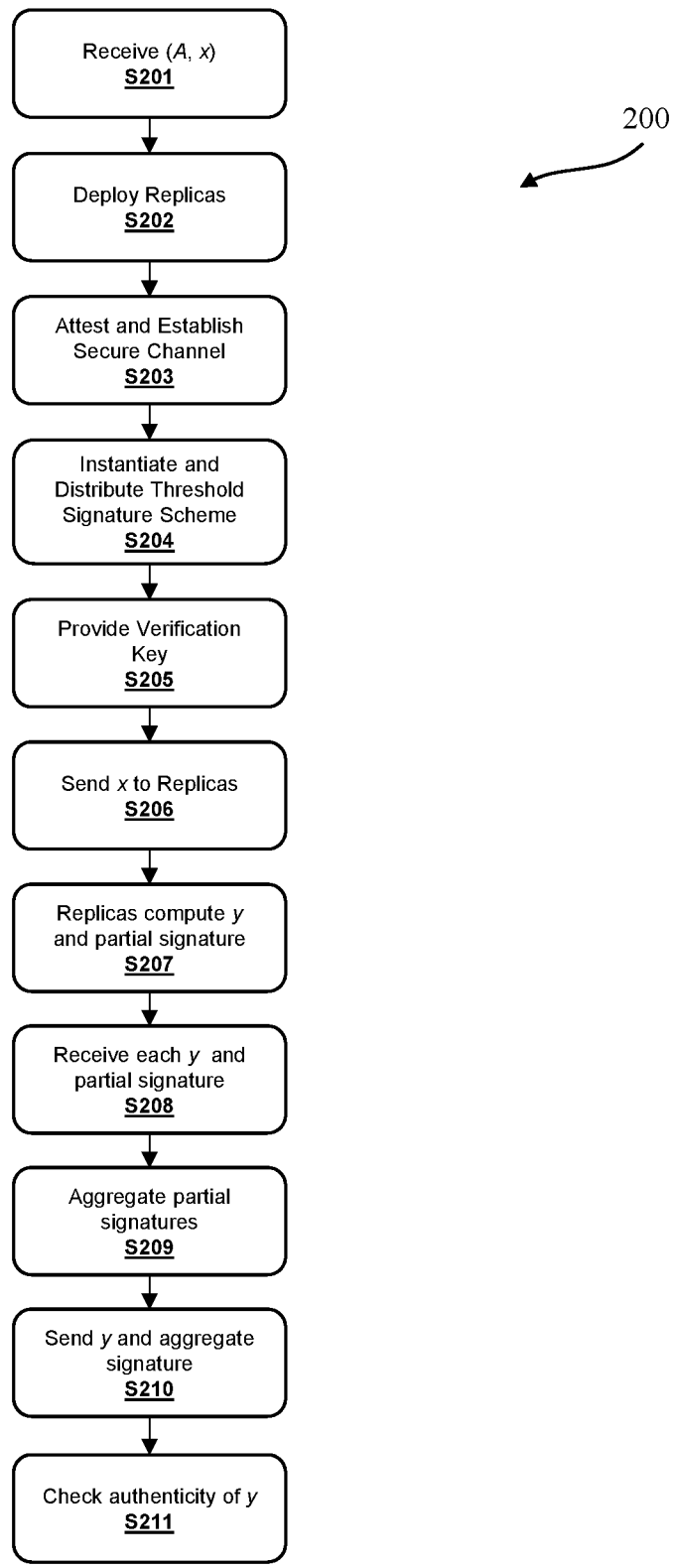
FIG. 2 illustrates a method according to an embodiment of the present invention.

FIG. 2 illustrates a method 200 for providing security in trusted execution environments according to an embodiment of the present invention. In particular, the method 200 secures a trusted execution environment from, inter alia, a side channel attack. The method 200 may be operated in a system (such as system 100) that includes at least one application owner (such as application owner 110) at least one master application (such as master application 120), and a plurality of trusted execution environment enabled platforms (such as platform $P_i$). For example, there can be n SGX-enabled platforms, which may be at the application owner's premises or remote. Also, the master application may run on an additional TEE platform (i.e., a master trusted execution environment platform), such as an SGX-enabled platform.

In the method, the master application receives an application binary A and an input x from the application owner (S201). In an embodiment, the application binary A computes a function $f$ to calculate and output y from the input x.

The master application deploys n replicas of application binary A over n different secure platforms (S202). The secure platforms include trusted execution environment enclaves; for example, the secure platforms may be SGX-enabled platforms.

The master application attests each replica and establishes a secure channel with each replica of the application binary A (S203).

The master application instantiates a threshold signature scheme and distributes shares of the signing scheme to the replicas (S204). The master application provides the verification key of the threshold signature scheme to the application owner (S205).

The master application sends the input x to each of the replicas (S206).

Each replica computes the output, i.e., y=$f$(x), and computes a partial signature of the output y using its share of the signing key (S207).

The master application receives each replica's output y and each replica's partial signature (S208).

The master application aggregates the partial signature into a standard signature (S209).

The master application sends the output y and the standard signature to the application owner (S210).

The application owner checks authenticity of the output y by verifying the standard signature using the verification key (S211).

Figure 3:
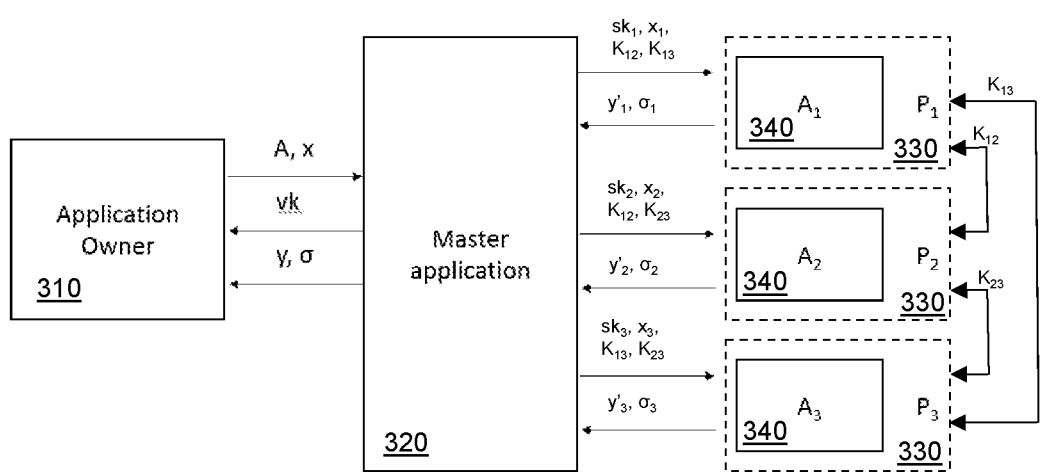
FIG. 3 illustrates another system implementing an embodiment of the present invention.

Referring to FIG. 3, another embodiment of a system 300 according to the invention is illustrated. In the system 300, the application owner 310 provides the master application 320 with a TEE application code A, an input x, and a replication parameter n.

For $1 \leq i \leq n$, the master application 320 deploys the application A on the platform $P_i$. This is done by sending a replica of the application A to the platform $P_i$. The platform $P_i$, in turn, installs the application A in a local enclave 340 of the compute device 330 hosting the platform $P_i$. $A_i$ denotes the replica of the application A that runs in an enclave 340 on the platform $P_i$.

The master application 320 verifies that the replica $A_i$ of the application A is running in an enclave 340 on the platform $P_i$ by means of a remote attestation service. For example, an embodiment can use the remote attestation service provided by Intel SGX. Remote attestation also allows the master application 320 and the replica application $A_i$ to establish a confidential channel by means of a shared key sk. Any further communication between the master application 320 and any application replica $A_i$ happens over the corresponding confidential channel.

For each pair of application replicas $A_i$, $A_j$ ($1 \leq i, j \leq n$), the master application 320 picks at random a key $K_{ij}$ and distributes it to $A_i$ and $A_j$. Any further communication between $A_i$ and $A_j$ happens over the confidential channel established by means of $K_{ij}$.

According to another embodiment, each pair of application replicas $A_i$, $A_j$ ($1 \leq i, j \leq n$) may attest each-other by means of the remote attestation service, e.g., the remote attestation service of Intel SGX, in order to establish a confidential channel by means of a shared key. Any further communication between $A_i$ and $A_j$ happens over the confidential channel established.

In an embodiment, the master application 320 splits x in n additive random shares $x_1, \ldots, x_n$. This can be done, for example, by picking $x_1, \ldots, x_{n-1}$ at random and then setting $x_n = x - (x_1 + \ldots + x_{n-1})$. The master application 320 sends share $x_i$ to application replica $A_i$.

If $f$ is linear, e.g., $f = ax + b$, then each replica $A_i$ computes $y'_i = f'(x_i) = ax_i$, and outputs $y'_i$. The master application 320 computes $y = \sigma_{i=1}, \ldots, n y'_i + b$ and sends it to the application owner 310. Here, the master application may be considered a trusted entity to act on behalf of the owner.

If $f$ is non-linear, then all application replicas $A_i$ engage in a secure multi-party computation protocol to compute linear shares of $y = f(x)$. For example, the SPDZ framework can be used (see e.g., Hähnel discussing SPDZ). The SPDZ framework uses an offline phase where parties must compute shares of triplet a,b,c such that c=ab. In settings of embodiments, all such triplets can be defined, shared, and distributed by the master application 320 to the application replicas $A_i$. That is, given a random triplet a,b,c, the master application 320 computes n (linear) shares of a as $a_1, \ldots, a_n$ and sends $a_i$ to $A_i$. The same approach is used to compute and distribute shares of b and c. Once all triplets have been shared across the application replicas $A_i$, all of them move to the online phase of the SPDZ protocol to compute shares of y. Here, $y'_i$ is the share of y held by the application replica $A_i$ at the end of the online phase of the SPDZ protocol. $A_i$ sends $y'_i$ to the master application 320. The master application 320 aggregates (i.e., sums) all $y'_i$ ($1 \le i \le n$) to recovery and forwards it to the application owner 310.

Figure 4:
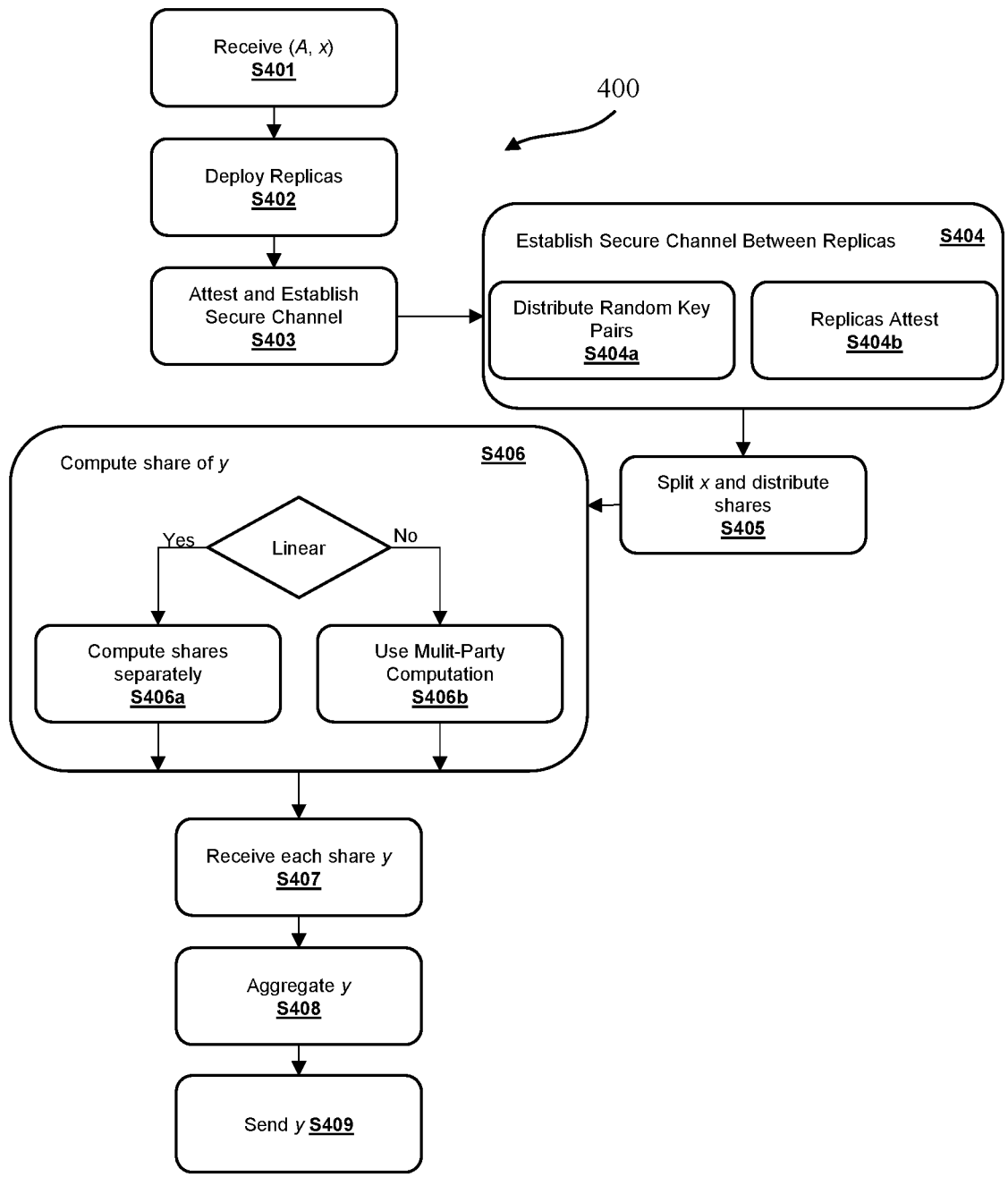
FIG. 4 illustrates another method according to an embodiment of the present invention.

FIG. 4 illustrates a method 400 for providing security in trusted execution environments according to an embodiment of the present invention. In particular, the method 400 secures a trusted execution environment from, inter alia, a side channel attack. The method 400 may be operated in a system (such as system 300) that includes at least one application owner (such as application owner 310) at least one master application (such as master application 320), and a plurality of trusted execution environment enabled platforms (such as platforms $P_i$). For example, there can be n SGX-enabled platforms, which may be at the application owner's premises or remote. Also, the master application may run on an additional SGX-enabled platform.

In the method, the master application receives an application binary A and an input x from the application owner (S401). In an embodiment, the application binary A computes a function $f$ to calculate and output y from the input x. The function $f$ may be linear or non-linear.

The master application deploys n replicas of application binary A over n different secure platforms (S402). The secure platforms include trusted execution environment enclaves; for example, the secure platforms may be SGX-enabled platforms.

The master application attests each replica and establishes a secure channel with each replica of the application binary A (S403).

Each pair of replicas establishes a secure connection between them (S404). In an embodiment, the master application distributes a random key to each pair of replicas for establishing the secure channel (S404a). In an embodiment, each pair of replicas performs remote attestation to form the secure channel (S404b).

The master application splits the input x into n additive random shares, and sends a share to each of the replicas (S405).

Each replica computes its share of the output (S406). When the function $f$ is linear, then each replica computes its share of the output separately (S406a). When the function $f$ is non-linear, then all replicas engage in a secure multi-party computation protocol to compute their output shares (S406b). Once the output shares are computed, the output shares are sent to and received by the master application (S407).

The master application aggregates the output shares to compute the output (S408).

The master application sends the output to the application owner (S409).

Figure 5:
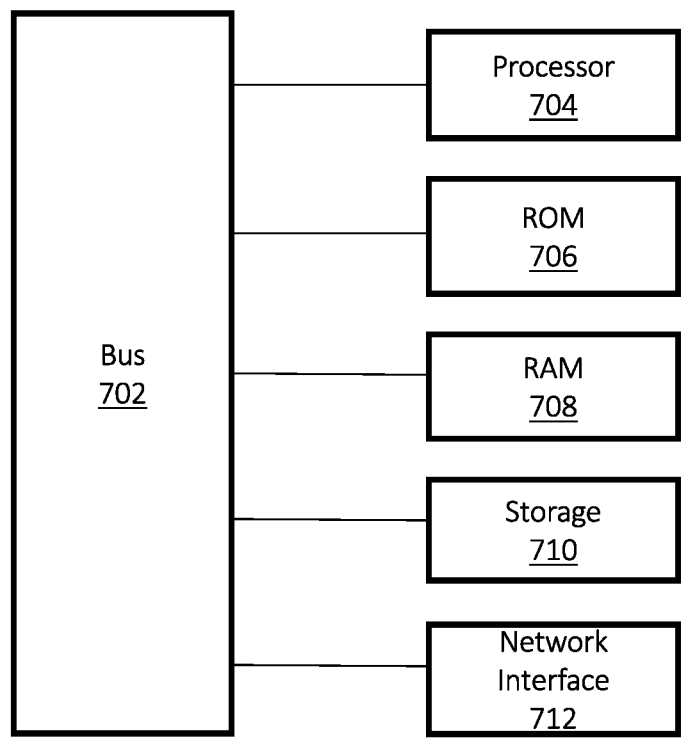
FIG. 5 is a block diagram of a processing system according to one embodiment of the present invention.

FIG. 5 is a block diagram of a processing system according to one embodiment for providing a secure trusted execution environment. The processing system can be used to implement the system and method described above. For example, each of the platforms, the application owner, and master application may be implemented on a processing system such as shown in FIG. 5. Each processing system includes at least one processor 704, such as a central processing unit (CPU) of the computing device or a dedicated special-purpose processor, executes computer executable instructions comprising embodiments of the system for performing the functions and methods described above. In embodiments, the computer executable instructions are stored (e.g., locally stored) and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securing a system comprising an application owner, a master application, and a plurality secure platforms, the method comprising:

receiving, by the master application from the application owner, an application and an input, the application configured to compute a function to calculate an output from the input when executed;

deploying, by the master application, a plurality of replicas of the application on a number of the secure platforms;

establishing, by the master application, a secure channel with each of the replicas;

sending, by the master application, at least a portion of the input to the replicas;

receiving, by the master application, a result calculated by each of the replicas, the result being determined according to the function and the at least the portion of the input;

determining, by the master application, the output based on the result received from each of the replicas;

sending, by the master application to the application owner, the output, instantiating, by the master application a threshold signature signing scheme, the instantiating comprising:
 distributing, by the master application, a respective share of a signing key of the threshold signature signing scheme to each of the replicas; and
 sending, by the master application, a verification key of the threshold signature signing scheme to the application owner; and receiving, by the master application from each of the replicas, a respective partial signature of the result calculated by the respective one of the replicas, the respective partial signature being based on the respective share of the signing key.

2. The method according to claim 1,
wherein the master application sends the entire input to each of the replicas, and
wherein the respective result received by the master application for each of the replicas corresponds to the output of the function applied to the input.

3. The method according to claim 1, the method further comprising:
generating, by the master application, a reconstructed signature based on the respective partial signature received from each of the replicas; and
outputting, by the master application, the reconstructed signature to the application owner,
wherein the reconstructed signature is configured to be verified by the verification key,
wherein the respective result received by the master application for each of the replicas is signed with the respective partial signature, and
wherein the output is configured to be verified using the reconstructed signature and the verification key.

4. The method according to claim 1, wherein the master application and the secure platforms are instantiated in trusted execution environment enclaves.

5. The method according to claim 1, the method further comprising:
receiving, by the master application, a replication parameter,
wherein the number of replicas and the number of security platforms each correspond to the replication parameter.

6. The method according to claim 1, wherein the number of secure platforms is at least two.

7. The method according to claim 1, the method further comprising:
respectively selecting, by the master application, a key for each pair of the replicas, and
respectively sending, by the master application, the respective key to each pair of the replicas, the respective key being configured to enable a secure channel between the respective pair of the replicas.

8. The method according to claim 7, wherein the key is a random key.

9. The method according to claim 1, the method further comprising:
splitting, by the master application, the input into shares of the input,
wherein the at least a portion of the input respectively sent to each of the respective replicas corresponds to one of the shares of the input, and
wherein the respective result calculated by each of the replicas is a partial result that is determined according to the function applied to the respective one of the shares of the input;
wherein the output is determined by aggregating the partial result respectively received from each of the replicas.

10. The method according to claim 9, wherein the function is linear and the respective partial result received is calculated individually by the respective one of the replicas.

11. The method according to claim 9, wherein the function is non-linear and the respective partial result received is calculated based on a secure multi party protocol between the replicas.

12. A secure platform comprising a processor coupled to a non-transitory storage memory containing instructions, which when executed by the processor, cause the secure platform to instantiate a master application in a secure enclave, the master application configured to perform the following operations:
receive an application and an input, the application configured to compute a function to calculate an output from the input when executed;
deploy a plurality of replicas of the application on a number of secure platforms;
establish a secure channel with each of the replicas;
send at least a portion of the input to the replicas;
receive a result calculated by each of the replicas, the result being determined according to the function and the at least the portion of the input;
determine the output based on the result received from each of the replicas;
send to an application owner, the output;
instantiate a threshold signature signing scheme, the instantiating comprising:
 distributing a respective share of a signing key of the threshold signature signing scheme to each of the replicas; and
 sending a verification key of the threshold signature signing scheme to the application owner; and
receive, from each of the replicas, a respective partial signature of the result calculated by the respective one of the replicas, the respective partial signature being based on the respective share of the signing key.

13. The secure platform according to claim 12, wherein the master application is configured to utilize either a replication and threshold signature scheme or a replication and multi-party computation scheme to protect against side-channel attacks.

14. A non-transitory computer-readable storage medium storing instructions that upon execution cause a master application, instantiated in a secure enclave, to perform the following operations:
receive an application and an input, the application configured to compute a function to calculate an output from the input when executed;

deploy a plurality of replicas of the application on a number of secure platforms;
establish a secure channel with each of the replicas;
send at least a portion of the input to the replicas;
receive a result calculated by each of the replicas, the result being determined according to the function and the at least the portion of the input;
determine the output based on the result received from each of the replicas;
send to an application owner, the output;
instantiate a threshold signature signing scheme, the instantiating comprising:
  distributing a respective share of a signing key of the threshold signature signing scheme to each of the replicas; and
  sending a verification key of the threshold signature signing scheme to the application owner; and
receive, from each of the replicas, a respective partial signature of the result calculated by the respective one of the replicas, the respective partial signature being based on the respective share of the signing key.

* * * * *